(12) United States Patent
Boström et al.

(10) Patent No.: US 12,089,168 B2
(45) Date of Patent: *Sep. 10, 2024

(54) POWER HEADROOM CONTROL ELEMENT, METHOD OF COMMUNICATING POWER INFORMATION FROM A USER EQUIPMENT, METHOD FOR PROCESSING RECEIVED POWER INFORMATION AS WELL AS A CORRESPONDING USER EQUIPMENT AND BASE STATION

(71) Applicant: Telefonaktiebolaget LM Ericsson (publ), Stockholm (SE)

(72) Inventors: Lisa Boström, Solna (SE); Robert Baldemair, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 87 days.

This patent is subject to a terminal disclaimer.

(21) Appl. No.: 17/569,723

(22) Filed: Jan. 6, 2022

(65) Prior Publication Data

US 2022/0132443 A1 Apr. 28, 2022

Related U.S. Application Data

(63) Continuation of application No. 16/564,248, filed on Sep. 9, 2019, now Pat. No. 11,252,680, which is a
(Continued)

(51) Int. Cl.
*H04W 52/36* (2009.01)
*H04W 52/14* (2009.01)
(Continued)

(52) U.S. Cl.
CPC ......... *H04W 52/365* (2013.01); *H04W 52/54* (2013.01); *H04W 52/58* (2013.01); *H04W 52/146* (2013.01)

(58) Field of Classification Search
CPC ... H04W 52/365; H04W 52/54; H04W 52/58; H04W 52/146
See application file for complete search history.

(56) References Cited

U.S. PATENT DOCUMENTS 9,408,162 B2 * 8/2016 Ho ................... H04W 52/367
2003/0232622 A1 12/2003 Seo et al.
(Continued)

FOREIGN PATENT DOCUMENTS

CN 101715207 A 5/2010
RU 2 251 220 C2 4/2005
(Continued)

OTHER PUBLICATIONS

Samsung, "PH calculation of non-transmitting CC," 3GPP TSG-RAN2#71bis meeting, Xian, China, Oct. 11-15, 2010, R2-105403, 3 pages.
(Continued)

*Primary Examiner* — Ajit Patel
*Assistant Examiner* — Wilfred Thomas
(74) *Attorney, Agent, or Firm* — Sage Patent Group

(57) ABSTRACT

The present invention relates to a power headroom control element for communicating power information from a user equipment (UE) to a base station (BS), a corresponding method, a method for processing received power information at a radio access network (RAN) as well as to a user equipment for communicating power information and a base station configured to process received power information, which particularly enable simple handling and processing of transmission power information, respectively. A power headroom control element is structured to comprise a power headroom field containing power headroom information and having a predetermined number of bits in the power headroom control element, and an indicator field associated with
(Continued)

the power headroom field, wherein the indicator field serves to indicate whether a transmission power field with a predetermined number of bits is present in the power headroom control element.

20 Claims, 11 Drawing Sheets

Related U.S. Application Data continuation of application No. 15/339,165, filed on Oct. 31, 2016, now Pat. No. 10,440,664, which is a continuation of application No. 13/318,801, filed as application No. PCT/EP2011/060808 on Jun. 28, 2011, now Pat. No. 9,516,610.

(60) Provisional application No. 61/410,508, filed on Nov. 5, 2010.

(51) Int. Cl.
*H04W 52/54* (2009.01)
*H04W 52/58* (2009.01)

(56) References Cited

U.S. PATENT DOCUMENTS

| | | | |
|---|---|---|---|
| 2008/0254819 A1 | 10/2008 | Niwano et al. | |
| 2009/0318180 A1 | 12/2009 | Yi et al. | |
| 2010/0093386 A1* | 4/2010 | Damnjanovic | H04W 52/04 455/522 |
| 2010/0120397 A1 | 5/2010 | Kazmi et al. | |
| 2010/0120446 A1 | 5/2010 | Gaal et al. | |
| 2010/0296470 A1 | 11/2010 | Heo et al. | |
| 2010/0297993 A1 | 11/2010 | Heo et al. | |
| 2011/0038271 A1* | 2/2011 | Shin | H04W 52/16 370/252 |
| 2011/0080881 A1 | 4/2011 | Hsu | |
| 2011/0092217 A1 | 4/2011 | Kim | |
| 2011/0205966 A1 | 8/2011 | Iwai et al. | |
| 2011/0281614 A1* | 11/2011 | Kitahara | H04W 52/367 455/522 |
| 2011/0292874 A1 | 12/2011 | Ho et al. | |
| 2011/0310760 A1 | 12/2011 | Wu et al. | |
| 2012/0040708 A1 | 2/2012 | Jeong et al. | |
| 2012/0044882 A1 | 2/2012 | Kim et al. | |
| 2012/0082041 A1 | 4/2012 | Damnjanovic et al. | |
| 2012/0106477 A1 | 5/2012 | Kwon et al. | |
| 2012/0224552 A1* | 9/2012 | Feuersanger | H04L 5/0053 370/329 |
| 2013/0128829 A1 | 5/2013 | Sebire et al. | |
| 2013/0215849 A1* | 8/2013 | Heo | H04W 52/365 370/329 |

FOREIGN PATENT DOCUMENTS

| | | |
|---|---|---|
| RU | 2008 110 964 A | 9/2009 |
| WO | WO 2009/118367 A2 | 10/2009 |
| WO | WO 2009/153978 A1 | 12/2009 |
| WO | WO 2009/154403 A2 | 12/2009 |
| WO | WO 2010/065759 A2 | 6/2010 |
| WO | WO 2010/149103 A1 | 12/2010 |
| WO | WO 2011/150361 A1 | 12/2011 |
| WO | WO 2011/159222 A1 | 12/2011 |
| WO | WO 2012/044102 A2 | 4/2012 |
| WO | WO 2012/056273 A1 | 5/2012 |

OTHER PUBLICATIONS

International Search Report, PCT Application No. PCT/EP2011/060808, Sep. 20, 2011.

$3^{rd}$ Generation Partnership Project; "Further details for Rel-10 PHR", MediaTek, 3GPP TSG- RAN WG2 Meeting #71bis; R2-105444, Oct. 11-15, 2010, XP050452602, France.

$3^{rd}$ Generation Partnership Project; "PHR MAC CE design" ZTE cooperation, 3GPP TSG-RAN WG2 #7bis; Tdoc R2-105341, Oct. 11-15, 2010, XP050452396, France.

$3^{rd}$ Generation Partnership Project; "LS response on per-UE PHR"; TSG RAN WG1, (Release 10), 3GPP TSG RAN WG2 Meeting #72, R2-106046, Nov. 15-19, 2010, XP050491881, France.

$3^{rd}$ Generation Partnership Project; "LS on the reference format on virtual PHR"; TSG RAN WG1, (Release 10), 3GPP TSG RAN WG2 Meeting #72, R2-106048, Nov. 15-19, 2010, XP050491883, France.

$3^{rd}$ Generation Partnership Project; "Technical Specification Group Radio Access Network"; Evolved Universal Terrestrial Radio Access (E-UTRA); Medium Access Control (MAC) protocol specification, (Release 9), 3GPP TS 36.321 V9.3.0 (Jun. 2010) XP050441909, France.

$3^{rd}$ Generation Partnership Project; "PHR MAC CE for Carrier Aggregation"; Potevio, 3GPP TSG RAN WG2 Meeting #72, R2-106325, Nov. 15-19, 2010, XP050466178, France.

International Preliminary Report on Patentability Corresponding to International Application No. PCT/EP2011/060808; Date of Mailing: Mar. 5, 2013; 8 Pages.

Reply to Written Opinion Dated Sep. 20, 2011, International Application No. PCT/EP2011/060808, Jul. 25, 2012.

Reply to Written Opinion Dated Nov. 6, 2012, International Application No. PCT/EP2011/060808, Jan. 17, 2013.

Written Opinion of the International Preliminary Examining Authority for International Application No. PCT/EP2011/060808, mailed Nov. 6, 2012, 8 pages.

3GPP TS 36.213 V9.3.0 (Sep. 2010) "3rd Generation Partnership Project; Technical Specification Group Radio Access Network; Evolved Universal Terrestrial Radio Access (E-UTRA); Physical layer procedures (Release 9)", 650 Route des Lucioles, Sophia Antipolis, Valbonne, France, Sep. 2010, 80 pages.

Japanese Office Action Corresponding to Japanese Patent Application No. 2013-537046, Mailing Date: Oct. 20, 2014; Foreign Text, 2 Pages, English Translation Thereof, 2 Pages.

LG Electronics "Power Headroom Report in Carrier Aggregation", TSG-RAN WG1 Meeting #62, R1-104761, Madrid, Spain, Aug. 23-27, 2010, 2 Pages.

MediaTek, "Further details for Rel-10 PHR", 3GPP TSG-RAN WG2 Meeting #71bis, R2- 105444, Xi'an, China, Oct. 11-15, 2010, 3 Pages.

Kim et al., "PHR Handing in Carrier Aggregation", U.S. Appl. No. 61/410,493, filed Nov. 5, 2010, 36 pages.

Kim et al., "Discussion on PHR", U.S. Appl. No. 61/392,436, filed Oct. 12, 2010, 13 pages.

Kim et al., "Discussion on PHR format", U.S. Appl. No. 61/389,476, filed Oct. 4, 2010, 10 pages.

Kim et al., "Discussion on PHR", U.S. Appl. No. 61/383,437, filed Sep. 16, 2010, 13 pages.

Kim et al., "PHR Hanlding for LTE-A", U.S. Appl. No. 61/374,160, filed Aug. 16, 2010, 28 pages.

Kim et al., "PHR Handing in Carrier Aggregation", U.S. Appl. No. 61/372,452, filed Aug. 10, 2010, 26 pages.

Lee, "LS response on per-UE PHR", 3GPP TSG-RAN WG1 Meeting #62bis, R12-105796, Xi'an, China, Oct. 11-15, 2010, 1 Page.

Gerstenberger, "LS on the reference format on virtual PHR", 3GPP TSG-RAN WG1 Meeting #62bis, R1-105820, Xi'an, China, Oct. 11-15, 2010, 1 Page.

First Office Action and English language translation, Chinese Application No. 201180064401.8, Sep. 18, 2015.

Decision on Grant with English language translation, Russian Application No. 2013125767/07(038068), Oct. 12, 2015.

Bostrom, et al., "Power Headroom Report (PHR) Identification," U.S. Appl. No. 61/356,248, filed Jun. 18, 2010, 23 pages.

"LS Response on Per-UE PHR," 3GPP TSG-RAN WG1 #62bis, Xi'an, China, Oct. 11-15, 201 O (R1-105796) Release-10, 1 page.

ITRI, "PHR format for CA," 3GPP TSG RAN WG2 #71bis Xi'an, China, Oct. 11-15, 2010, R2-105818, 5 pages.

(56) References Cited

OTHER PUBLICATIONS

Ericsson, et al., "WF on PHR reference formats," 3GPP RAN WG1 #62bis Xi'an, China, Oct. 11-15, 2010, R1-105802, 2 pages.

* cited by examiner

| 1 | 1 | 0 | 1 | 0 | 0 | 0 | 0 |
|---|---|---|---|---|---|---|---|
| R | R | \multicolumn{6}{c|}{PH (Type 2)} |
| R | R | \multicolumn{6}{c|}{PH (Type 1)} |
| R | R | \multicolumn{6}{c|}{PH (Type 1)} |
| R | R | \multicolumn{6}{c|}{PH (Type 1)} |
| 1 | 0 | 0 | 1 | 0 | 0 | 0 | 0 |
| R | R | \multicolumn{6}{c|}{Pcmax,c} |
| R | R | \multicolumn{6}{c|}{Pcmax,c} |
| R | R | \multicolumn{6}{c|}{Pcmax,c} |

| R | V | PH (910) |
|---|---|---|
| R | R | Pcmax,c (930) |

920 / 910

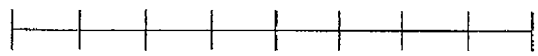

Fig. 14A                    Fig. 14B

| R-bit indicator included in Type 1 PHR | R-bit indicator included in Type 2 PHR | Comment |
|---|---|---|
| 0 | 0 | Neither Type 1 nor Type 2 PHR is based on a real transmission, i.e. in this TTI neither a PUSCH nor PUCCH transmission takes place on PCell.<br><br>No Pcmax,c needs to be reported. |
| 0 | 1 | Type 1 PHR is based on a virtual/reference PUSCH format. Type 2 PHR is based on real PUCCH and virtual/reference PUSCH format.<br><br>Pcmax,c for Type 2 PHR accounting for PUCCH transmission needs to be transmitted. |
| 1 | 0 | Type 1 PHR is based on a real PUSCH format. Type 2 PHR is based on a virtual/reference PUCCH and real PUSCH format.<br><br>Pcmax,c for Type 1 PHR accounting for PUSCH transmission needs to be reported. The Pcmax,c associated with the Type 2 PHR may also be reported if needed. |
| 1 | 1 | Both Type 1 and Type 2 PHR are based on real transmissions.<br><br>Pcmax,c for Type 1 (PUSCH only) and Type 2 (PUSCH and PUCCH) needs to be reported. Depending on UE implementation/ standardization one or potentially two Pcmax,c needs to be reported. |

Fig. 15

POWER HEADROOM CONTROL ELEMENT, METHOD OF COMMUNICATING POWER INFORMATION FROM A USER EQUIPMENT, METHOD FOR PROCESSING RECEIVED POWER INFORMATION AS WELL AS A CORRESPONDING USER EQUIPMENT AND BASE STATION

CROSS REFERENCE TO RELATED APPLICATIONS

This application is a continuation of U.S. patent application Ser. No. 16/564,248, filed on Sep. 9, 2019, which is a continuation of U.S. patent application Ser. No. 15/339,165, filed on Oct. 31, 2016, which is a continuation of U.S. patent application Ser. No. 13/318,801, filed on Nov. 4, 2011, which itself is a 35 U.S.C. § 371 national stage application of PCT International Application No. PCT/EP2011/060808, filed on Jun. 28, 2011, which itself claims the benefit of priority of U.S. Provisional Application No. 61/410,508, filed on Nov. 5, 2010. The disclosures of all of the above referenced applications are hereby incorporated herein in their entireties by reference.

FIELD OF THE INVENTION

The present invention relates to a power headroom control element for communicating power information from a user equipment (UE) to a base station (BS), a method of communicating power information from a UE to a BS, a method for processing received power information at a radio access network (RAN) as well as to a user equipment for communicating power information and a base station configured to process received power information, which particularly enable simple handling and processing of a transmission power information, respectively.

TECHNOLOGICAL BACKGROUND

In a typical cellular radio system, wireless terminals which are also known as mobile terminals, mobile stations and/or user equipment units communicate via a radio access network (RAN) with one or more core networks. User equipment units or simply user equipment (UE) may include mobile telephones, such as cellular telephones, and/or other processing devices with wireless communication capabilities, for example portable, pocket, handheld, laptop computers, which communicate voice and/or data with the RAN.

The RAN covers a geographical area which is divided into cell areas, with each cell area being served by a base station, e.g., a radio base station (RBS), sometimes simply referred to as base station (BS), which in some networks is also called a "NodeB" or enhanced NodeB which can be abbreviated as "eNodeB" or "eNB" in Long Term Evolution (LTE). A cell is a geographical area where radio coverage is provided by the radio base station equipment at a base station side. The base stations communicate over the air interface operating on radio frequencies with UEs within a range of the base stations.

In some versions of the RAN, several BSs are typically connected, e.g. by landlines or microwave, to a radio network controller (RNC). The radio network controller, also sometimes termed a base station controller (BSC), supervises and coordinates various activities of the plural BSs connected thereto. The RNCs are typically connected to one or more core networks. Core networks generally comprise a Mobile Switching Center (MSC) that provides circuit-switched services and a serving GPRS support node (SGSN) that provides packet-switch type services.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UTRAN, short for UMTS Terrestrial Radio Access Network, is a collective term for the NodeBs and RNCs which make up the UMTS radio access network. Thus, UTRAN is essentially a radio access network using WCDMA for user equipment units.

The Third Generation Partnership Project (3GPP) has undertaken to evolve further the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

FIG. 1 is a simplified block diagram of a Long Term Evolution (LTE) RAN 100. The LTE RAN 100 is a variant of a 3GPP RAN where radio base station nodes (eNodeBs) are connected directly to a core network 130 rather than to RNC nodes. In general, in LTE the functions of a RNC node are performed by the radio base station nodes, sometimes simply referred to as base stations. Each of the radio base station nodes, in FIG. 1 eNodeBs 122-1, 122-2, ... 122-M, communicate with UEs, e.g. UE 110-1, 110-2, 110-3, ... 110-L, that are within their respective communication service cells. The radio base station nodes (eNodeBs) can communicate with one another through an X2 interface and with the core network 130 through S1 interfaces, as is well known to the one who is skilled in the art.

The LTE standard is based on multi-carrier based radio access schemes such as Orthogonal Frequency-Division Multiplexing (OFDM) in the downlink and Discrete Fourier Transform (DFT)—spread OFDM in the uplink. The OFDM technique distributes the data over a large number of carriers that are spaced apart at precise frequencies. This spacing provides the "orthogonality" in this technique which avoids having demodulators see frequencies other than their own. The benefits of OFDM are high spectral efficiency, resiliency to radio frequency (RF) interference, and lower multi-path distortion. The basic LTE downlink physical resource can thus be seen as a time-frequency grid as illustrated in FIG. 2A, where each resource element corresponds to one OFDM subcarrier during one OFDM symbol interval. In more detail, the LTE downlink physical resource of FIG. 2A shows subcarriers having a spacing of $\Delta f=15$ kHz and a close-up of one OFDM symbol including a cyclic prefix.

In the time domain, LTE downlink transmissions are organized into radio frames of 10 ms, each radio frame consisting of 10 equally-sized subframes of length $T_{subframe}=1$ ms as shown in the LTE time-domain structure of FIG. 2B.

Furthermore, the resource allocation in LTE is typically described in terms of resource blocks, where a resource block corresponds to one slot (0.5 ms) in the time domain, i.e. two slots per subframe, and 12 contiguous subcarriers in the frequency domain. Resource blocks are numbered in the frequency domain, starting with zero from one end of the system bandwidth. Downlink transmissions are dynamically scheduled, i.e. in each subframe the BS transmits control information indicating to which (mobile) terminals and on which resource blocks the data is transmitted during the current downlink subframe. This control signalling is typically transmitted in the first 1, 2, 3 or 4 OFDM symbols in each subframe. A downlink system (downlink subframe) with 3 OFDM symbols as control region is illustrated in FIG. 3.

Next, a physical uplink control channel (PUCCH) is described. As implied by the name, the PUCCH carries uplink control information, e.g., hybrid-ARQ (hybrid Automatic Repeat Request), Channel Quality Indicator (CQI), ACK/NACK, etc. LTE uses hybrid-ARQ (hybrid Automatic Repeat Request), where, after receiving downlink data in a subframe, the terminal, e.g. user equipment, attempts to decode it and reports to the BS whether the decoding was successful (ACK) or not (NACK). In case of an unsuccessful decoding attempt, the BS can retransmit the erroneous data.

Uplink control signalling from the terminal to the base station may include hybrid-ARQ acknowledgements for received downlink data; terminal reports related to the downlink channel conditions, used as assistance for the downlink scheduling (also known as Channel Quality Indicator (CQI)); and/or scheduling requests, indicating that a mobile terminal needs uplink resources for uplink data transmissions.

If the mobile terminal has not been assigned an uplink resource for data transmission, the L1/L2 (Layer 2 and/or Layer 2) control information (channel-status reports, hybrid-ARQ acknowledgements, and scheduling requests) is transmitted in uplink resources (resource blocks) specifically assigned for uplink L1/L2 control information on the physical uplink control channel (PUCCH).

Different PUCCH formats are used for the different information, e.g., PUCCH Format 1a/1b are used for hybrid-ARQ feedback, PUCCH Format 2/2a/2b for reporting of channel conditions, and PUCCH Format 1 for scheduling requests.

Next, a Physical Uplink Shared Channel (PUSCH) is described. Resources for PUSCH are allocated on a subframe basis by the scheduler. To transmit data in the uplink, the mobile terminal, such as the previously mentioned UE, has to be assigned an uplink resource for data transmission on the Physical Uplink Shared Channel. A PUSCH resource assignment is shown in FIG. 4, in which the resources assigned to two different users are illustrated for one subframe. The middle SC-symbol in each slot is used to transmit a reference symbol. If the mobile terminal has been assigned an uplink resource for data transmission and at the same time instance has control information to transmit, it will transmit the control information together with the data on PUSCH.

In the following, the concept of carrier aggregation is explained. LTE release 8 has recently been standardized, supporting bandwidth up to 20 MHz, for example comprising the above-described subcarriers. However, in order to meet the IMT-advanced requirements, 3GPP has initiated work on LTE release 10. One of the key components of LTE release 10 is the support of bandwidth beyond 20 MHz while ensuring backward compatibility with LTE release 8. This should also include spectrum compatibility and implies that an LTE release 10 carrier, wider than 20 MHz, should be realized as a number of LTE carriers to an LTE release 8 terminal. Each such carrier can be referred to as a component carrier (CC). In particular, for early LTE release 10 deployments it can be expected that there will be a smaller number of LTE release 10-capable terminal compared to many LTE legacy terminals. Therefore, it may be necessary to assure an efficient use of a wide carrier also for legacy terminals, i.e. that it is possible to implement carriers where legacy terminals can be scheduled in all parts of the wideband LTE release 10 carrier. The straightforward way to obtain this would be by means of carrier aggregation (CA). CA implies that an LTE release 10 terminal can receive multiple CCs (component carriers), where the CCs have, or at least have the possibility to have, the same structure as a release 8 carrier. CA is illustrated in FIG. 5 having an aggregated bandwidth of 100 MHz realized by 5 component carriers.

The number of aggregated CCs as well as the bandwidth of the individual CC may be different for uplink and downlink. A symmetric configuration refers to the case where the number of CCs in downlink and uplink is the same whereas an asymmetric configuration refers to the case that the number of CCs is different. It is important to note that the number of CCs configured in a cell may be different from the number of CCs seen or used by a terminal. A terminal may, for example, support more downlink CCs than uplink CCs, even though the cell is configured with the same number of uplink and downlink CCs.

Next, uplink power control for PUSCH and PUCCH, described above, is explained. Uplink power control is used both on the PUSCH and on the PUCCH. The purpose is to ensure that the mobile terminal transmits with sufficiently high but not too high power since the later would increase the interference to other users in the network. In both cases, a parameterized open loop combined with a closed loop mechanism is used. Roughly, the open loop part is used to set a point of operation, around which the closed loop component operates. Different parameters (targets and partial compensation factors) for a user and control plane are used. For more detailed description, it is referred to section 5.1.1.1 for PUSCH power control and 5.1.2.1 for PUCCH power control of 3GPP TS 36.213, Physical Layer Procedures, e.g. Version 9.3.0 of 2010-10-03 http://www.3gpp.org/ftp/Specs/html-info/36213.htm.

To control the UEs uplink (UL) power, the eNB will use TPC (Transmission Power Control) commands which will order the UE to change its transmission power either in an accumulated or absolute fashion. In LTE release 10, the UL power control is managed per component carrier. As in release 8/9 PUSCH and PUCCH power control is separate. In LTE release 10 the PUCCH power control will only apply to the Primary Component Carrier (PCC) since this is the only UL CC configured to carry PUCCH.

Since the TPC commands do not have any ACK/NACK, the eNB cannot be sure that the commands are received by the UE, and since the UE can falsely decode the PDCCH (Physical Downlink Control Channel) and think it received a TPC command, counting the used TPC commands cannot be used to estimate a reliable current output power from the UE. Additionally, the UE also compensates its power level autonomously (based on path loss estimates), and this adjustment is not known to the eNB. For these two reasons the eNB needs to receive PHRs (Power Headroom Reports) regularly in order to make competent scheduling decisions and control the UE UL power.

In the following, the power headroom reporting is explained. In LTE release 8, the base station may configure the UE to send power headroom reports periodically or when the change in path loss exceeds a certain configurable threshold. The power headroom reports indicate how much transmission power the UE has left for a subframe I, i.e., the difference between the nominal UE maximum transmit power and the estimated required power. The reported value is in the range 40 to –23 dB, where a negative value shows that the UE did not have enough power to conduct the transmission.

The eNB uses the reported power headroom (PH) as input to the scheduler. Based on the available power headroom the scheduler will decide a suitable number of PRBs (Physical Resource Blocks) and a good MCS (Modulation and Coding Scheme) as well as a suitable transmit power adjustment (TPC command). In carrier aggregation, the eNB would make such evaluation per UL CC since power is controlled per CC according to RAN1 decisions.

Since we have UL power control per CC and separate for PUSCH and PUCCH, this will also be reflected in the power headroom reporting. For release 10 there will be two types of PH reports:

Type 1 power headroom report—computed as: P_cmax,c minus PUSCH power (P_cmax,c—P_PUSCH)

Type 2 power headroom report—computed as: P_cmax,c minus PUCCH power minus PUSCH power (P_cmax, c—P_PUCCH—P_PUSCH)

The Secondary Component Carriers will always report Type 1 PHR since they are not configured for PUCCH. The Primary Component Carrier would report both Type 1 and Type 2 PHR. Type 1 and Type 2 PHR must be reported in the same subframe.

Applying the release 8 framework for Power Headroom Reporting to Carrier Aggregation would imply that a PHR for a specific component carrier is sent on that component carrier itself. Furthermore, a PHR may only be transmitted on a component carrier if the terminal has PUSCH resources granted on this CC.

In RAN2 (Radio Access Network 2), it is proposed to extend this framework so that PHR for one component carrier can be transmitted on another component carrier. This enables to report rapid path loss changes on one component carrier as soon as the terminal has PUSCH resources granted on any configured UL component carrier. More specifically, a path loss change by more than dl -PathlossChange dB on any component carrier triggers transmission of a PHR on any (the same or another) component carrier for which the terminal has PUSCH resources granted.

In addition to the PHR, there will be a Pcmax,c report per CC reporting the configured transmission power of the UE, which is denoted Pcmax,c in 3GPP 36.213.

The Pcmax,c report may either be included in the same MAC (Medium Access Control) control element as the PH reported for the same CC, or it may be included in a different MAC control element. Some details are specified in R1-105796 (3GPP Liaison Statement), but exact formats and rules are not defined yet.

Power headroom will in release 10 be reported for all configured and activated CCs. This means that some of the CCs reporting PH may not have a valid UL (uplink) grant in the TTI (Transmission Time Interval) where power headroom is reported. They will then use a reference format PUSCH and/or PUCCH to report a so-called virtual/reference format PH/PHR. These reference formats are described in R1-105820 (3GPP Liaison Statement). This may be useful since they may be scheduled and transmit in the future. In other words, for a so called virtual transmission, the CC is activated but it is not transmitting, however might be scheduled to transmit in the future.

Upon configuration, each CC is assigned a Cell Index which is unique for all CCs configured for a specific UE. The SIB2 (System Information Block 2) linked UL and DL are associated with the same Cell Index. The Cell Index can have a value 0-7. The Primary Cell (PCell) is always assigned the value zero.

The reporting of one or more PHs relating to one or more CCs can be done using a PH MAC control element, however, the format thereof is not defined. In particular, for reporting power headrooms as well as transmission power information, such as Pcmax,c, extra overhead may be generated leading to a waste of resources.

It is desirable to provide a vehicle, such as a control element, which allows efficient reporting of power information as well as methods, user equipments, base stations, systems and computer programs which allow to report or handle transmission power information, such as Pcmax,c, efficiently.

SUMMARY

Such a control element, methods, user equipment, base station, system and computer program are defined in the independent claims. Advantageous embodiments are described in the dependent claims.

In one embodiment, a power headroom control element is provided for communicating power information from a user equipment (UE) to a base station (BS) in a Radio Access Network (RAN). The power headroom control element is structured to comprise a power headroom field containing power headroom information. The power headroom field has a predetermined number of bits, particularly at a predetermined location, in the power headroom control element. The power headroom control element is further structured to comprise an indicator field associated with the power headroom field. The indicator field serves to indicate whether a transmission power field with a predetermined number of bits is present in the power headroom control element. Accordingly, the presence of a transmission power field may be easily and efficiently reported without creating large overhead.

In one embodiment, a method of communicating power information including a power headroom from a UE to a BS in a RAN is provided. The method comprises the steps of determining whether a transmission power field containing information about the transmission power of the uplink serving cell associated with a power headroom is to be sent together with the power headroom, and if it is determined that the transmission power field is to be sent, adding a power headroom field with the power headroom value and the transmission power field for transmission to a power headroom control element and setting an indicator to a specific value to indicate that the transmission power field is included. Accordingly, a simple method of communicating power information by a power headroom control element is provided.

In one embodiment, a method carried out by a BS in a RAN is provided for processing received power information including a power headroom report of a received power headroom control element from a UE. The method comprises the steps of determining whether a value in an indicator field associated with a power headroom field of the received power headroom control element is set to a specific value which indicates that a transmission power field associated with the power headroom field is included in the power headroom control element, and reading the transmission power field if the value of the indicator field is set to the specific value. Accordingly, the power information included in a power headroom control element can easily and quickly be evaluated.

In one embodiment, a method of communicating a power headroom control element including a power headroom from a UE to a BS in a RAN is provided, wherein the power headroom control element is constructed in the above described way. Accordingly, power information can be efficiently communicated.

In one embodiment, a user equipment for communicating power information including a power headroom to a BS in a RAN is provided. The UE comprises a processor configured to determine whether a transmission power field containing information about the transmission power of the uplink serving cell associated with the power headroom is to be sent together with the power headroom, and to control adding a power headroom field with the power headroom value and the transmission power field for transmission to a power headroom control element and setting an indicator to a specific value to indicate that the transmission power field is included, if it is determined that the transmission power field is to be sent. Accordingly, a UE is provided which is able to efficiently communicate power information by controlling the structure and information content of a power headroom control element.

In one embodiment, a base station in a RAN is provided, which is configured to process received power information including a power headroom report of a received power headroom control element from a UE. The base station comprises a processor configured to determine whether a value in an indicator field associated with a power headroom field of the received power headroom control element is set to a specific value which indicates that a transmission power field associated with a power headroom field is included in the power headroom control element, and to read the transmission power field if the value is set to the specific value. Accordingly, power information received in a power headroom control element can be easily and quickly evaluated.

In another embodiment, a system for communicating power information is provided which comprises the user equipment and base station described above.

In another embodiment a memory is provided which stores the power headroom control element constructed as described above. In another embodiment, a computer program is provided which includes instructions configured, when executed on a data processor, to cause the data processor to execute one of the above described methods.

Further, advantageous embodiments of the invention are disclosed in the dependent claims.

BRIEF DESCRIPTION OF THE DRAWINGS

FIGS. 14A and 14B illustrating exemplary power headroom control elements when the power headroom fields are not byte-aligned according to an embodiment.

FIG. 15 illustrates a table illustrating different settings of indicator bits and their meanings.

DESCRIPTION OF THE EMBODIMENTS

The further embodiments of the invention are described with reference to the Figures. It is noted that the following description contains examples only and should not be construed as limiting the invention.

In the following, similar or same reference signs indicate similar or same elements, units or operations.

FIGS. 6 to 14 illustrate power headroom control elements, which constitute, for example, power headroom MAC control elements described above. The skilled person understands that the control elements herein described are data elements used for conveying information, particularly in an LTE RAN. In the following, the format of the power headroom control elements will be described in more detail.

Figure 1:
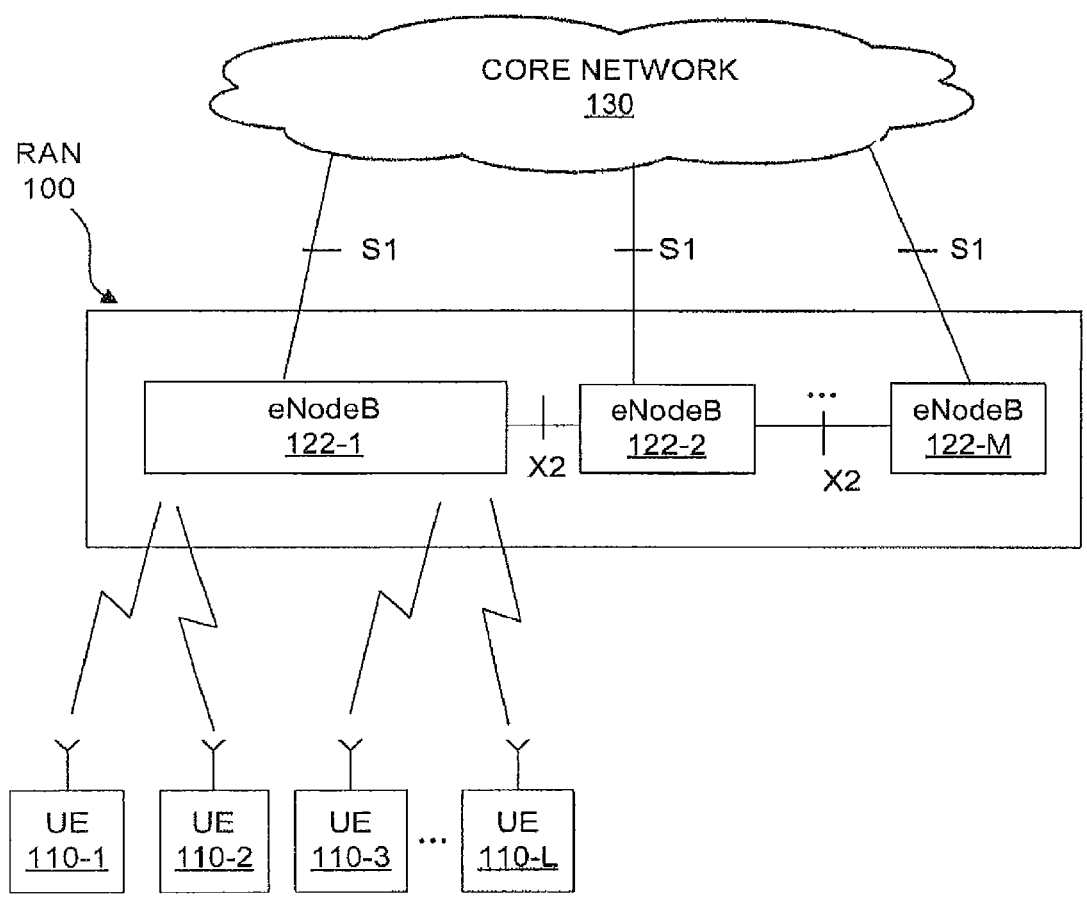
FIG. 1 illustrates a block diagram of an LTE RAN as known to the skilled person.
Figure 2A:
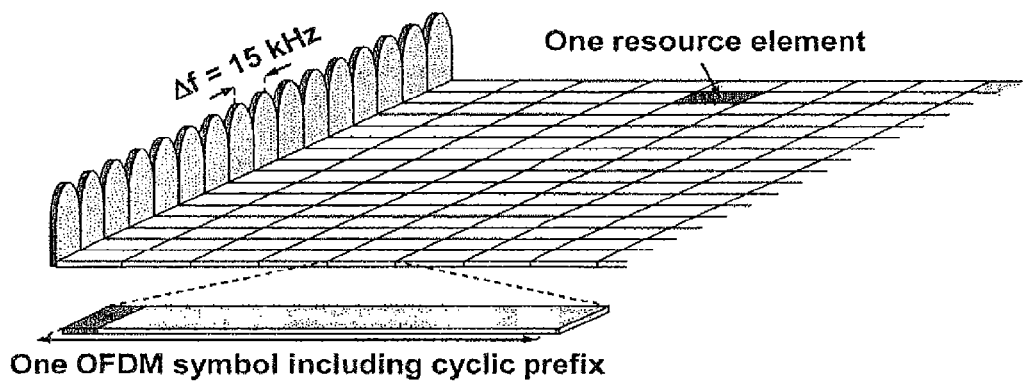
FIG. 2A illustrates the structure of an LTE downlink physical resource.
Figure 2B:
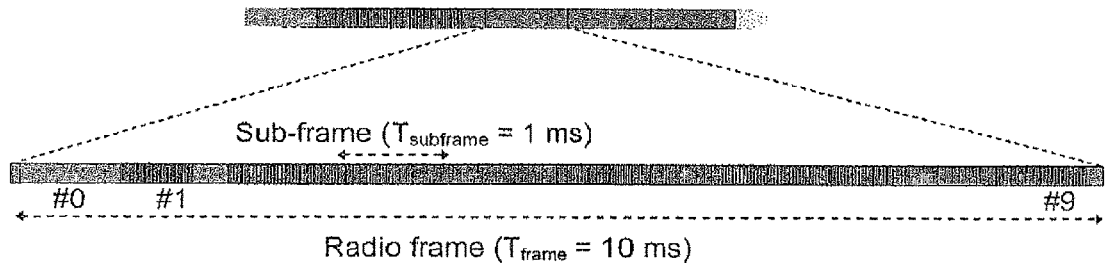
FIG. 2B illustrates radio frames and subframes in the time-domain in LTE.
Figure 3:
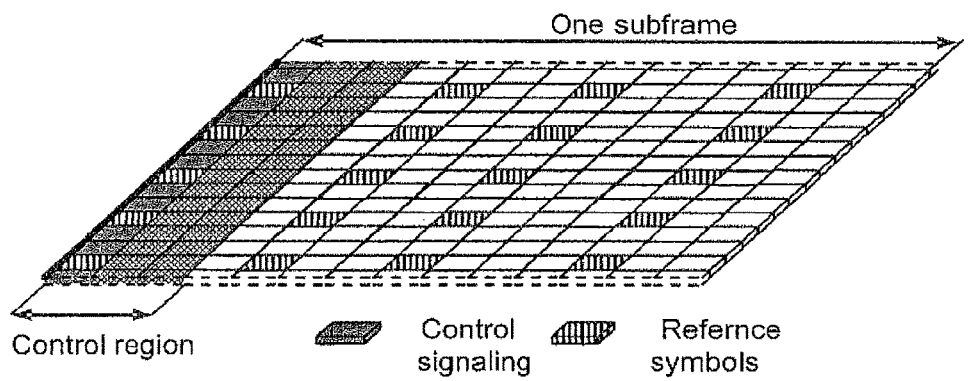
FIG. 3 illustrates a downlink subframe used in LTE.
Figure 4:
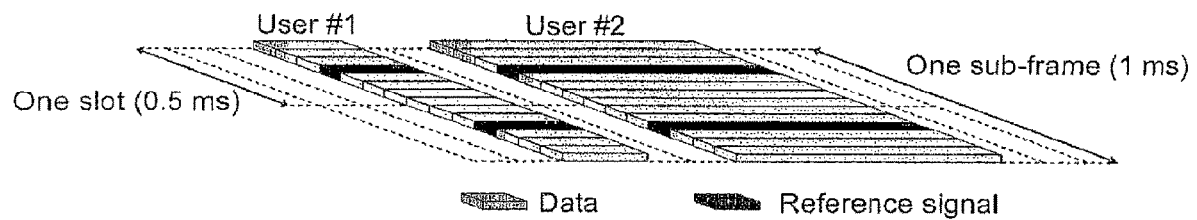
FIG. 4 illustrates a PUSCH resource assignment.
Figure 5:
FIG. 5 illustrates the concept of carrier aggregation.
Figure 6:
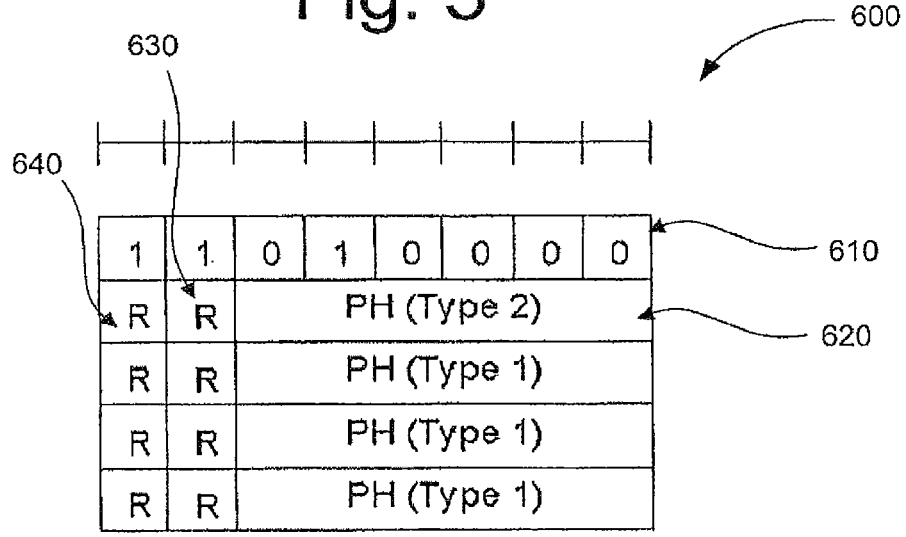
FIG. 6 illustrates an example of a power headroom control element using a bit map solution.

A power headroom control element is, for example, used to convey power information from a UE to a BS in a RAN, e.g. LTE RAN, and is described in 3GPP TS 36.321, e.g. version 9.3.0 of June 2010. For example, the power headroom control element 600 of FIG. 6 is structured to comprise an 8-bit bitmap 610 to indicate which component carriers or respective uplink serving cells are reporting a power headroom report, which is a report including the information about the power headroom, wherein the information about the power headroom, e.g. specific values, can be included in a power headroom field. In detail, the bit fields 630 and 640 contain an R-bit each, i.e. a reserved bit, usually set to zero. The PH field 620 is the power headroom field indicating the power headroom level. The length of this field is usually 6 bits. In particular, the power headroom field 620 reports a Type 2 PHR in the power headroom control element of FIG. 6 and the PH fields below report Type 1 PHRs. If a Type 2 PHR is present or not is dependent on configuration and does not need to be indicated. As can be seen from FIG. 6, the PH field is placed at a predetermined location in the power headroom control element (PH CE), namely the PH field is at bit positions 3 to 8 within one octet of the power headroom control element, which octet contains the power headroom for one specific CC.

Each bit of the 8-bit bitmap 610 corresponds to one cell index from 0 to 7, such as the cell index of an uplink serving cell. In the example of FIG. 6, the PH fields included in the power headroom MAC CE are ordered based on the cell index in increasing order, i.e. the cell indices 0 to 7 are assigned from left to right and the corresponding PH fields from the top to the bottom. It is clear that the cell index could also be assigned from right to left, i.e. in decreasing order when reading from left to right. The Type 2 PHR is included in the first PH field in this example but may as well be also included in the last PH field.

In more detail, the bit value 1 in the bitmap corresponding to the cell index 0 (furthest to the left in the bitmap) indicates that the primary cell (PCell) corresponding to the primary component carrier reports a Type 2 PHR in the PH (Type 2) field 620 and a Type 1 PHR in the PH (Type 1) field below field 620. The second bit value 1 at cell index 1 in the bitmap indicates that the first secondary cell corresponding to the first secondary component carrier also reports a Type 1 PHR and the bit value 1 at the fourth position (cell index 3) in the bitmap indicates that the third secondary cell also reports a Type 1 PHR in the last PH field of the power headroom control element in FIG. 6. The bit values 0 for the remaining cell indices indicate that either there is no CC configured with it or configured but currently deactivated. It will be described with respect to FIGS. 14A and 14B that the location of the PH field with respect to the 8-bit structure in FIG. 6 may be chosen differently. However, the PH field should always be placed at the same predetermined location in the control element, e.g. at a predetermined position in the octet such as bit positions 3 to 8 described above, so that its information may be found easily at the same location.

In the example of FIG. 6 an 8-bit bitmap is used so that this solution of communicating power information is called herein the bitmap solution.

Figure 7:
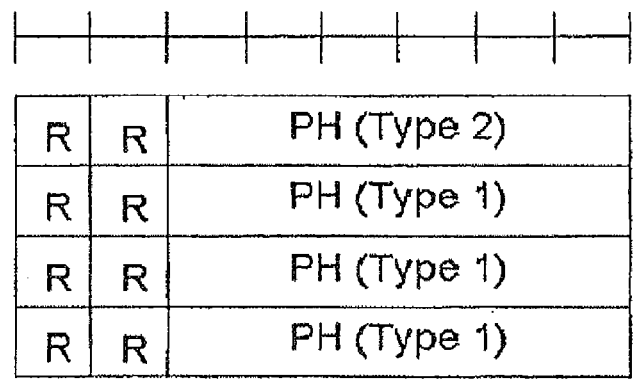
FIG. 7 illustrates an example of a power headroom control element using an ordering solution.

A different solution, namely the ordering solution, is explained with respect to FIG. 7. As can be seen in FIG. 7, a power headroom control element is illustrated not including an 8-bit bitmap. Since the power headroom report is reported for configured and activated CCs, it is assumed that both the eNodeB and the UE know which CCs are activated at a given point in time. If a Type 2 PHR is present or not is dependent on configuration and does not need to be indicated. Hence, a bitmap is not necessarily needed and the Type 1 PHRs are ordered based on cell index in decreasing or increasing order and the Type 2 power headroom report is either included first or last if present. The example in FIG. 7 shows a power headroom control element having a Type 2 PHR in the first PH field and Type 1 PHRs for cells with an increasing cell index.

Although the power information of the power headroom report can already be used as input to the scheduler by the eNodeB, it is further desirable to report the transmission power of the uplink serving cell or respective component carrier, such as Pcmax,c, together with the power headroom report(s) in order to be useful for the eNodeB, i.e. the base station. One example of transmission power per component carrier used for calculation of PH is known as Pcmax,c in 3GPP TS 36.213. Pcmax,c is also known from 3GPP TS 36.101 as the configured transmission power per component carrier. In this standard document, the UE is allowed to set its configured maximum output power, Pcmax. The ",c" is a notation to indicate that this is a CC-specific Pcmax.

If Pcmax,c is reported for all CCs reporting PHRs, all the Pcmax,c reports may follow in the same order as the PHRs according to either of the above solutions (bitmap solution or ordering solution) or the corresponding Pcmax,c report could be included after each PHR. Furthermore, they may also be included in their own power headroom MAC control element and in the same order as the power headroom reports.

However, if only a subset of the CCs report Pcmax,c, since it may not be necessary for CCs reporting power headroom reports using a so-called reference or virtual PUSCH or PUCCH format, for example, the above solutions would not work, since the eNodeB would not be able to know which CCs have a Pcmax,c report present or not.

Figures 8, 9:
FIG. 8 illustrates an example of a power headroom control element including two bitmaps.
FIG. 9 illustrates a power headroom control element according to an embodiment.

This problem may be solved by including another 8-bit bitmap in the power headroom control element, as shown in FIG. 8, to indicate which Pcmax,c reports are present. The first five lines including the bitmap of the power headroom control element of FIG. 8 are identical to the power headroom control element of FIG. 6, described above.

Additionally, as seen in FIG. 8, an extra octet is provided having a bitmap indicating the cells and thus the component carriers that report transmission power, such as Pcmax,c. In the example of FIG. 8, the primary component carrier reports Pcmax,c for the Type 2 power headroom report and a Pcmax,c for the Type 1 power headroom report of the primary component carrier as well as a Pcmax,c for the Type 1 power headroom report of the cell with cell index 3, i.e. third secondary cell. Accordingly, three Pcmax,c reports are reported with the power headroom control element of FIG. 8. Since the carrier component relating to cell index 1 reports a power headroom report but not a Pcmax,c report, this indicates that this component carrier does not have a valid uplink grant in the transmission time interval where the power headroom report is reported and thus uses a reference PUSCH format to report a so-called virtual/reference format power headroom report. However, by using the additional bitmap, additional overhead is generated in the control element and thus more economical solutions are desired.

Instead of using an additional bitmap to provide a link between the cell index and the transmission power, e.g. Pcmax,c, according to some embodiments, the association between a power headroom report and a CC may be reused to associate the Pcmax,c with a PHR instead of using an extra identifier to associate it with a CC. Accordingly, transmission power, such as Pcmax,c, may be reported more efficiently by associating the transmission power with a power headroom report only when it needs to be reported. This will be described in more detail below.

According to some embodiments, one or both of the R-bits in the octet, i.e. 8-bit-field, including the PH, i.e. power headroom information, may be used to indicate if this PH, and thus also the CC associated with this PH, has an associated transmission power report, e.g. Pcmax,c report.

For example, FIG. 9 illustrates a power headroom control element for communicating power information from a UE to a BS, e.g. an eNodeB, which is structured to comprise a power headroom field, namely the PH field 910. The PH field contains power headroom information, i.e. information about the power headroom which is to be reported, and has a predetermined number of bits at a predetermined location in the power headroom control element. As indicated above, the PH field has a length of 6 bits and is located at the bit positions 3 to 8 in an octet of the power headroom control element. In FIG. 9, one of the R-bits, in particular the second R-bit at the bit position 2 of the octet is used as an indicator field 920. The indicator field has one bit in FIG. 9 but it is also feasible that the indicator field may be extended to 2 bits, for example by including the R-bit at the bit position 1 of the octet. The indicator field 920 is associated with the PH field 910. In other words, since the indicator field 920 and the PH field 910 are in the same octet, a clear association between the fields is present.

The indicator field serves to indicate whether a transmission power field with a predetermined number of bits is present in the power headroom control element. The power headroom control element of FIG. 9 illustrates a transmission power field, here in particular the Pcmax,c field 930, which includes transmission power information, e.g. a Pcmax,c report. Similar to the PH field 910, also the transmission power field 930 may have a predetermined number of bits at a predetermined location, such as 6 bits at bit positions 3 to 8 in an octet of a power headroom control element. The two R-bits of the octet in which the transmission power field is located may remain unused.

The control element of FIG. 9 comprises an indicator field, a PH field and a transmission power field which is placed below the PH field, wherein the indicator field is placed in the same octet as the PH field and serves to indicate the presence of the transmission power field. In detail, the bits of the power headroom field and the associated indicator field form part of an octet of the power headroom control element and the bits of the transmission power field form part of an octet of the power headroom control element. Therefore, the transmission power field 930 is similarly to the PH field 910 associated with the same cell index as the PH field 910 due to the indicator field 920 being in the same octet as the PH field and indicating the presence of the transmission power field below (afterwards).

As explained above, the PH field 910 contains the power headroom information and is associated with an uplink serving cell. If the above mentioned ordering solution is used, a bitmap for indicating the associated cell index is not necessary so that the PH field 910, as the first PH field in the power headroom control element, is associated with the primary cell having the cell index 0. If the above mentioned bitmap solution is used, a bitmap may be included before the PH field indicating with which cell index the PH field is associated with. In the example of FIG. 9, a possible bitmap could be the bit value 1 for cell index 0 and the bit value 0 for the other cell indices 1 to 7.

In the previous discussion, the bit value 1 in a bitmap indicated that a PHR was present for the cell corresponding to the cell index. However, it is clear that the same indication may be achieved if the bit value 0 is defined as the bit value for which the corresponding cell has a PHR and the bit value 1 indicates that the corresponding cell has no power headroom report.

As can be seen in FIGS. 9 to 14, the PH field precedes the associated transmission power field in the power headroom control element. Particularly, the octet comprising the PH field precedes the octet comprising the associated transmission power field. Accordingly, the power headroom control element first conveys power headroom information in the PH field and then transmission power information in the transmission power field. In detail, the transmission power field contains information about the transmission power of the uplink serving cell or component carrier, e.g. Pcmax,c, which is associated with the preceding power headroom information.

As explained above, the at least one bit of the indicator field may indicate that a Pcmax,c report, i.e. a report about the transmission power of the uplink serving cell or associated component carrier, is present. In addition, the indicator field may also at the same time indicate whether this PH is of so-called virtual or reference format.

In detail, if a so-called virtual/reference format power headroom report is to be sent for a cell with a specific cell index, it is not necessary for the component carrier to report transmission power, such as Pcmax,c. In this case the CC is active but not transmitting, and for calculation of PH a so-called virtual transmission is used. Accordingly, an indicator, i.e. a bit value set in an indicator field, for example, a value indicating the presence of a so-called virtual or reference format power headroom report, may also be used to indicate whether a Pcmax,c report is transmitted or not. For example, if a virtual/reference format power headroom report is used and indicated, there will be no Pcmax,c report (transmission power report) for this CC reported in this TTI. Furthermore, in other embodiments, one of the R-bits of MAC subheader may be used to indicate that all power headroom reports reported in the specific TTI are associated with the same Pcmax,c report, at least for Type 1 reports.

According to the above, the transmission power reports, e.g. Pcmax,c reports, can be identified by reusing existing bits instead of adding an extra unnecessary identifier, such as an additional bitmap. In the above mentioned bitmap solution and ordering solution, and also for other possible solutions not mentioned here, the eNodeB will know which power headroom report is associated with which CC. Taking advantage of this fact, it is possible to associate the transmission power report to a specific PHR, i.e. the PHR already associated with the CC which the transmission power report is thus also associated with, rather than adding another identifier, such as the above mentioned additional bitmap. In other words, it is realized that the association between transmission power, power headroom and CC (Pcmax, c→PHR→CC) is possible and it is realized that one of the R-bits available in each octet containing a PH field (since the PH field itself is only 6 bits) can be used to indicate if the PHR, and hence also the CC associated with this PHR, has an associated transmission power, such as Pcmax,c, which is also reported in this TTI.

Based on this information, the eNodeB will know how many transmission power reports to expect and for which CCs. The transmission power reports, such as the Pcmax,c reports, can be included either directly after each associated PH field, particularly after each octet including the PH field, or all transmission power reports can be included in cell index order after all the PH fields. It is also possible that all transmission power reports are included in their own control element but the presence of each transmission power report may still be indicated using the R-bit of the octet of the PH associated with the same CC.

Furthermore, as described above, if it is agreed that Pcmax,c is always to be reported except for CCs reporting power headroom using the virtual/reference PUSCH and/or PUCCH format, the information provided to the eNodeB via this R-bit regarding whether Pcmax,c report is provided can also be used by the eNodeB to know whether the specific power headroom is based on a virtual/reference format transmission (when a PH is reported without Pcmax,c) or an actual transmission (when a PH is reported with a Pcmax,c).

In the following, power headroom control elements of different formats are described with respect to FIGS. 10 to 14 using the above mentioned ordering solution, bitmap solution and a combination of the ordering and bitmap solutions.

Figures 10, 11:
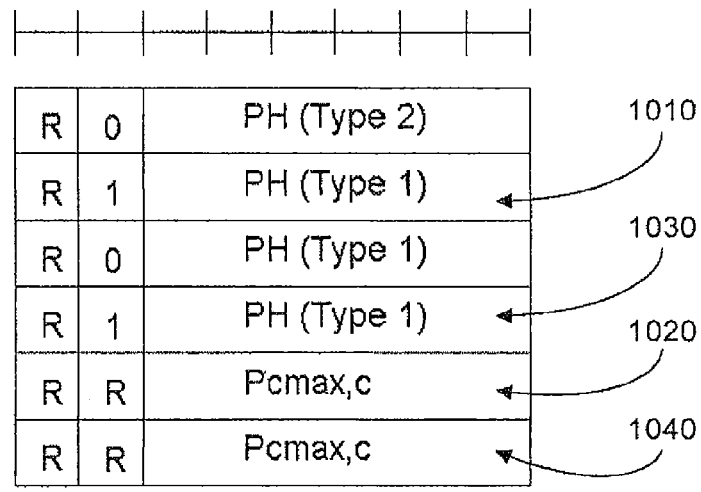
FIG. 10 illustrates an exemplary power headroom control element according to an embodiment.
FIG. 11 illustrates another exemplary power headroom control element using a bitmap according to an embodiment.

FIG. 10 illustrates an embodiment in which the associated Pcmax,c reports are added to the same power headroom control element after the PH fields using one of the R-bits in the octets of the PH fields to indicate the presence of Pcmax,c reports. In this embodiment, the octets with the PH fields are stacked according to the cell index with the PH associated with the primary cell (PCell, cell index=0) at the top including the Type 2 PH and Type 1 PH, and the Secondary Cells (SCells) following starting with the SCell of the lowest cell index.

In detail, the Type 2 and Type 1 PHs of the primary cell are shown in the first two entries and the Type 1 power headroom report of the first secondary cell and Type 1 power headroom report of the second secondary cell are shown from the top to the bottom. The rightmost (alternatively the leftmost) R-bit in the octet which also includes the power headroom information, is used to indicate if for this PH, i.e., the CC associated with this power headroom report, a Pcmax,c report is also included. In this embodiment, setting the bit to "1" indicates that a Pcmax,c report is to be expected, but in the same way, the value "0" could indicate this in another embodiment. In other words, the meaning of the bit value "1" could be changed to the meaning of the bit value "0" and vice versa.

The Pcmax,c reports are then stacked after the power headroom reports starting with a Pcmax,c report associated with the PHR associated with the CC of the lowest cell index and then the rest follows in consecutive order. In the example of FIG. 10, the Pcmax,c report 1020 is associated with the Type 1 power headroom report 1010 of the PH field associated with the PCell and the second Pcmax,c report 1040 is associated with the Type 1 power headroom report 1030 of the PH field associated with the second SCell.

The size of the field carrying the Pcmax,c report can be in the range from 5 to 8 bits, and is not significant as the R-bits used are only in the octets of the power headroom reports. Further, if the indicator field is constructed from only one R-bit, the PH field may even be extended to 7 bits.

Similar to the power headroom control element of FIG. 9, also the power headroom control element of FIG. 10 has a format, in which the bits of the power headroom field and the associated indicator field form part of an octet or full octet of the power headroom control element (PH field comprises 6 bits and indicator field 1 or 2 bits), and/or the bits of the transmission power field, e.g. including the Pcmax,c report or other transmission power report, form part of an octet of the same power headroom control element.

In the following, another example of a power headroom control element is described with respect to FIG. 11, in which a similar format as discussed with respect to FIGS. 9 and 10 is used, however using the above described bitmap solution.

In detail, the power headroom control element of FIG. 11 comprises a bitmap to indicate which uplink serving cell reports power headroom information as part of this power headroom control element.

In FIG. 11 the sequence of PH fields is the same as described previously with respect to FIG. 6 and the same cell indices are used. In FIG. 11, the bit values "1" in the bitmap indicate that power headroom reports for the primary cell, the first secondary cell and the third secondary cell are included. Further, as described previously with respect to FIG. 10, some of the R-bits are used as indicators having an indicator field and a specific value. In detail, the rightmost R-bits of the octets including the PH fields are used to indicate for which power headroom reports a transmission power report, such as a Pcmax,c report, is included. Specifically, it is indicated in FIG. 11 that for the Type 1 power headroom report associated with cell index 0 and the Type 1 power headroom report associated with the cell index 3, a transmission power report is included, which is shown by Pcmax,c in FIG. 11, wherein the first Pcmax,c report at the top is associated with the Type 1 PH field belonging to cell index 0 and thus associated with the primary cell and the second Pcmax,c report is associated with the Type 1 power headroom report belonging to the cell index 3 and thus the third SCell.

Figure 12:
FIG. 12 illustrates another exemplary power headroom control element including Type 1 power headroom reports according to an embodiment.
Figure 13:
FIG. 13 illustrates an exemplary power headroom control element including Type 2 and Type 1 power headroom reports according to an embodiment.

FIGS. 12 and 13 illustrate power headroom control elements similar to the one of FIG. 11 also comprising a bitmap. The octet containing the Type 2 PH field in FIG. 13 and the Type 1 PH field in FIG. 12 is provided at the top, after the MAC subheader of a PH MAC control element and after the bitmap, which is followed by an octet containing the associated transmission power if reported in a non-virtual format. Then octets are followed in an ascending order based on the cell index, wherein an octet with a PH field is followed by an octet with the associated transmission power field for each activated serving cell indicated by the bits in the bitmap. As mentioned above, a bit value of "1" in a bit field of the bitmap indicates that a PH field for the cell corresponding to the cell index of the bit field is reported. If the bit value is "0" a PH field is not reported. In FIGS. 12 and 13, only 7 bits of the bitmap are used to indicate the cell index and thus whether a report is associated with a primary cell or the secondary cells and the eighth bit of the bitmap is a reserved bit, R-bit. As already mentioned above, the cell index is provided in increasing order from the left to the right in FIGS. 6, 8, 11, 12 and 13 but in the same way, the cell index may also increase from the right to the left which merely is dependent on a predefined rule.

In contrast to the power headroom control element of FIG. 11, in which all power headroom fields are first included in the data element from the top to the bottom and then the associated transmission power fields are included, in FIGS. 12 and 13 the transmission power field is always included directly in the following octet after the corresponding PH field.

In more detail, in the example shown in FIG. 12, in which the power headroom control element only includes Type 1 PHRs, when Type 2 PHRs are not reported, the specific value of "1" in the indicator field of the indicator in the first octet indicates that a transmission power field is included in the next octet, wherein the transmission power field contains information about the transmission power of the uplink serving cell, such as Pcmax,c. After reporting the Pcmax,c, the next octet again comprises a PH field, such as the PH field shown in FIG. 12 containing the Type 1 PHR of the first secondary cell with a cell index 1. Since this octet again comprises an indicator field with a bit value of "1", the following octet will again comprise a transmission power field including, for example, a Pcmax,c report.

The power headroom control element of FIG. 13 is basically the same as in FIG. 12 merely that also a Type 2 PHR and an associated transmission power are reported for the primary cell in the two topmost octets. Here, Pcmax,c1 is associated with the Type 2 PHR, Pcmax,c2 is associated with the first Type 1 PHR and Pcmax,c3 is associated with the second Type 1 PHR.

In the examples shown in FIGS. 12 and 13, the values "1" of the indicator indicate that all power headroom reports are non-virtual PHRs. However, as mentioned above, if a virtual PHR is to be sent and Pcmax,c is not to be reported, as this Pcmax,c value can anyway be calculated by the eNodeB, the bit value in the indicator field may indicate that a power headroom is virtual, e.g. the bit value of "0" and that Pcmax,c will not be unnecessarily signalled for power headrooms based on a reference format or virtual format. Accordingly, the power headroom control element enables to send virtual power headroom reports for component carriers which have not granted transmission by the scheduler of the eNodeB.

As shown in FIGS. 9 to 13, for both Type 1 and Type 2 power headroom reports, an indicator field with a bit value=1 indicates the presence of an associated transmission power field, here the so called Pcmax,c field, and a bit value=0 indicates that the associated transmission power field is omitted. Alternatively, as described above, an indicator field with a bit value=0 may indicate the presence of the associated transmission power field and a bit value=1 may indicate that the associated transmission power field (Pmax,c field) is omitted.

In another embodiment, explained with respect to FIGS. 14a and 14b, the power headroom reports are not byte aligned. For example, there may be one indicator bit in the indicator field after (or before) each power headroom report, indicating either that a Pcmax,c is transmitted or not. If transmitted, it could either follow next or follow in the end or is transmitted in a separate control element.

In the above described examples, the R-bits which are used as indicator bits, may be also used to indicate whether the power headroom report is based on a virtual/reference PUSCH and/or PUCCH format. If it is desired to not report Pcmax,c associated to a power headroom report using a reference format for either PUSCH, PUCCH or both, this indicator can be used by the eNodeB to also derive the information whether a Pcmax,c report should be expected in this TTI or not.

In the following, some particularities of the PCell PHR are described, which is comprised by Type 1 and Type 2. Depending if none, one, or both PHRs are based on a virtual/reference format and also if Type 1 and Type 2 are based on different Pcmax,c, the number of included Pcmax,c fields for the PCell may vary. The table in FIG. 15 lists combinations formed by the indicator R-bits of Type 1 and Type 2 PHR octets and if a Pcmax,c is included or not (in this table a "0" indicates a reference format, but the opposite would be of course possible as well).

For example, as can be taken from the first line of the table, if the value of the bit of the indicator included in the same octet as the Type 1 PHR (first bit) is "0" and the value of the bit of the indicator included in the same octet as the Type 2 PHR (second bit) is "0", neither Type 1 nor Type 2 PHR is based on a non-virtual (real) transmission, i.e. in this TTI neither a PUSCH nor a PUCCH transmission takes place on a PCell. No Pcmax,c needs to be reported.

If the first bit value is "0" and the second bit value "1" as indicated in second line of FIG. 15, the Type 1 PHR is based on a virtual/reference PUSCH format and the Type 2 PHR is based on a real (non-virtual) PUCCH and virtual/reference PUSCH format. Pcmax,c for Type 2 PHR accounting for PUCCH transmission is transmitted.

If the first bit value is "1" and the second bit value "0", the Type 1 PHR is based on a real PUSCH format and the Type 2 PHR is based on a virtual/reference PUCCH and real PUSCH format. Pcmax,c for Type 1 PHR accounting for PUSCH transmission is reported and Pcmax,c associated with the Type 2 PHR may only be reported if needed.

If the first bit value is "1" and the second bit value "1", both Type 1 and Type 2 PHR are based on real transmissions. Pcmax,c for Type 1 (PUSCH only) and Type 2 (PUSCH and PUCCH) needs to be reported. Depending on UE implementation/standardization one or potentially two Pcmax,c need to be reported for the same CC.

In additional embodiments, all Pcmax,c values—at least for Type 1 PHRs—associated with the PHRs/CCs in this TTI may have the same value. Then, one R-bit of the MAC subheader may (or any other indicator in the MAC subheader or in the MAC control element itself) be used to indicate that all PHRs reported in this PHR MAC control element should be associated with the same Pcmax,c report. The Pcmax,c report could either be included in the same MAC control element or in separate MAC control element. These additional embodiments may be combined with the embodiments discussed in detail above, to use indicators to indicate which PHR should not have a Pcmax,c associated with it in the specific TTI and report.

According to the above embodiments, it is possible to not report Pcmax,c for all CCs which PH is reported for, i.e. only some Pcmax,c are reported. This may be useful in the case when a virtual format is used for the PH and the eNodeB already has knowledge of the information contained in the Pcmax,c report and will thus not need to receive it. Furthermore, in the embodiments described with respect to FIGS. 9 to 14, additional octets for identifying transmission power reports, such as Pcmax,c reports, may not be required and existing reserved bits may be used for identification thereof. Even if a PHR MAC control element solution which is not byte aligned is considered, as shown in FIGS. 14a and 14b, only one extra bit per reported PH may be required.

Furthermore, if transmission power, such as Pcmax,c, is always to be reported except for CCs reporting PH using the virtual/reference PUSCH and/or PUCCH format, the information provided to the eNodeB via this R-bit regarding a transmission power report, such as a Pcmax,c report, can also be used by the eNodeB to know if the specific PH is based on a virtual/reference format transmission or on an actual transmission. Since embodiments may work the other way round too (if the presence of a Pcmax,c report is indicated according to one of the embodiments and its presence is dependent on a non-virtual/non-reference format PH), two types of information could be obtained from the same indicator bit.

In the following, flow charts illustrating operations according to some embodiments are described.

Figure 16:
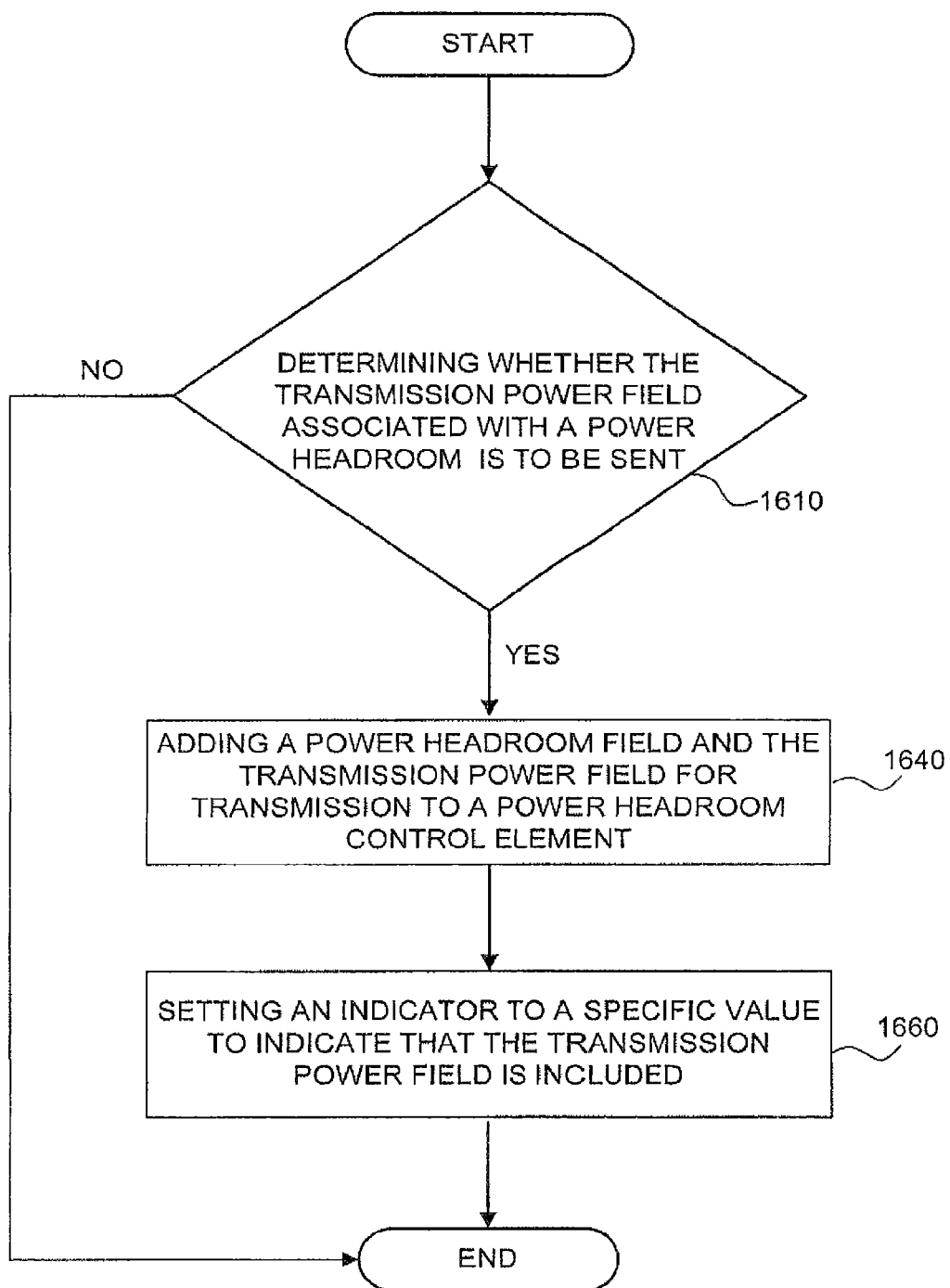
FIG. 16 illustrates a flow diagram of a method of communicating power information according to an embodiment.

The flow chart shown in FIG. 16, describes operations of communicating power information including a power headroom report from a UE to a BS, e.g. eNodeB.

In the first step 1610, it is determined whether a transmission power field associated with a PH is to be sent. In more detail, it is determined whether a transmission power field containing information about the transmission power of the associated uplink serving cell, such as the power Pcmax, c, associated with a PH is to be sent together with the PH.

If it is determined in step 1610 in FIG. 16 that a transmission power field is not to be sent, the process flow ends. However, if it is determined in step 1610 that a transmission power field, such as a field including a Pcmax,c report, is to sent, for example if the associated power headroom report is based on actual transmission, the PH field and the transmission power field are added for transmission to a power headroom control element in step 1640. Accordingly, a PH control element including a PH field and a transmission power field similar to the one of FIG. 9 is provided.

In step 1660, an indicator is set to a specific value to indicate that an octet containing the transmission power field is included in the PH MAC control element. In more detail, the indicator is comprised of an indicator field having included therein a bit with a specific value. For example, if the specific value of the bit is 1, it is indicated that the transmission power is reported in the transmission power field, i.e. a Pcmax,c report is included.

In one embodiment, the determining step 1610 is carried out if it is previously determined that a PHR was triggered. In other words, if it is decided that for a specific serving cell a PH is to be reported, it has to be checked whether the PH is of virtual or real format and based thereon a transmission power field is included or not included in the PH control element. Accordingly, whether a transmission power field is to be sent is based on whether the cell has an uplink grant valid for transmission in this TTI, i.e. a non-virtual or actual transmission.

If it is determined that the transmission power field is not be sent, for example if the associated PH is of virtual format, the PH, i.e. the virtual PH, is added to a power headroom control element and the indicator is set to another specific value to indicate that the transmission power field is not included. If the previously described specific value of step 1660 is taken to be "1", the other specific value is then taken to be "0".

Similarly, if it is determined that the PH is to be prepared based on a virtual transmission, i.e. in the case of a virtual PH, the indicator is set to the other specific value to indicate that an associated transmission power field is not included in the PHR.

Figure 17:
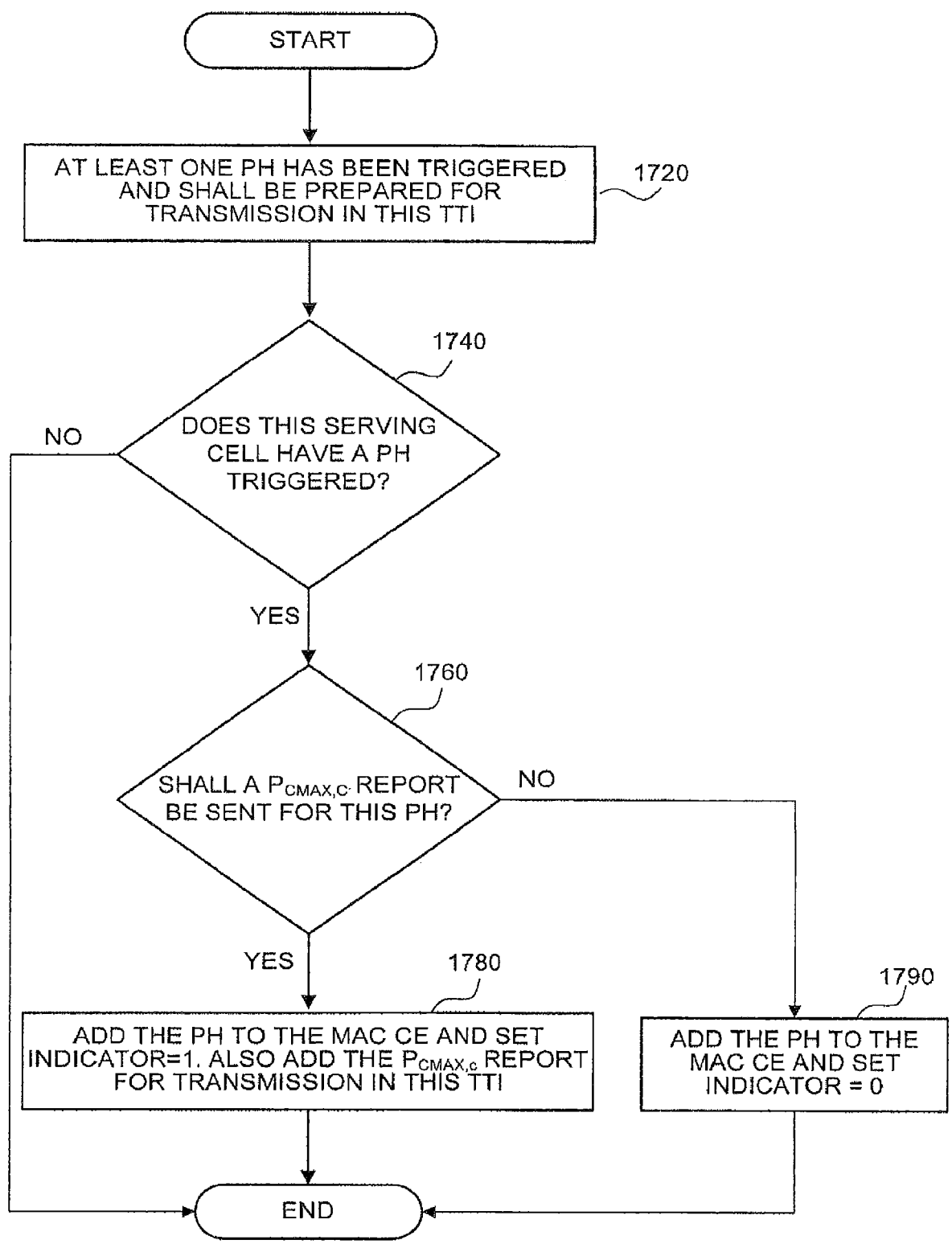
FIG. 17 illustrates a method of communicating power information in more detail according to an embodiment.

The flow diagram of FIG. 17 describes the above explained steps in a more detailed order showing an example of how the indicator is set for the SCells. For the PCells it is possible that two PHRs are triggered, each associated with its own Pcmax,c report which may be illustrated similarly.

In step 1720 at least one PHR has been triggered and is to be prepared for transmission in this transmission time interval (TTI).

Then the following steps will be performed for each SCell. In step 1740, it is checked whether the serving SCell has a PHR triggered. If this SCell has a PHR triggered, the flow proceeds to step 1760, wherein it is checked whether a associated Pcmax,c report is to be sent with this PHR.

If no Pcmax,c report is to be sent, for example, because the associated PH is of virtual format, the flow proceeds to step 1790, in which the PH is added to the PH MAC control element and the indicator is set to "0".

If it is determined in step 1760 that a Pcmax,c report which is associated with this PH, is to be sent, for example, if the PH is based on a real transmission, the flow proceeds to step 1780, in which the PH, in particular the PH field, is added to the PH MAC control element and an indicator is set to "1". Furthermore, the Pcmax,c report is added for transmission in this TTI.

According to the flow charts of FIGS. 16 and 17, if the specific value of the indicator in the indicator field is "1", the presence of a Pcmax,c field associated with a PH is indicated and if the value of the indicator in the indicator field is another specific value, here "0", it is indicated that the Pcmax,c field is omitted. This determination is independent on the type of the PH and thus may be performed for Type 1 and Type 2 PHs. Alternatively, the specific value "0" may indicate that a Pcmax,c report is to be expected and another specific value "1" may indicate that a Pcmax,c report is not to be expected.

Figure 18:
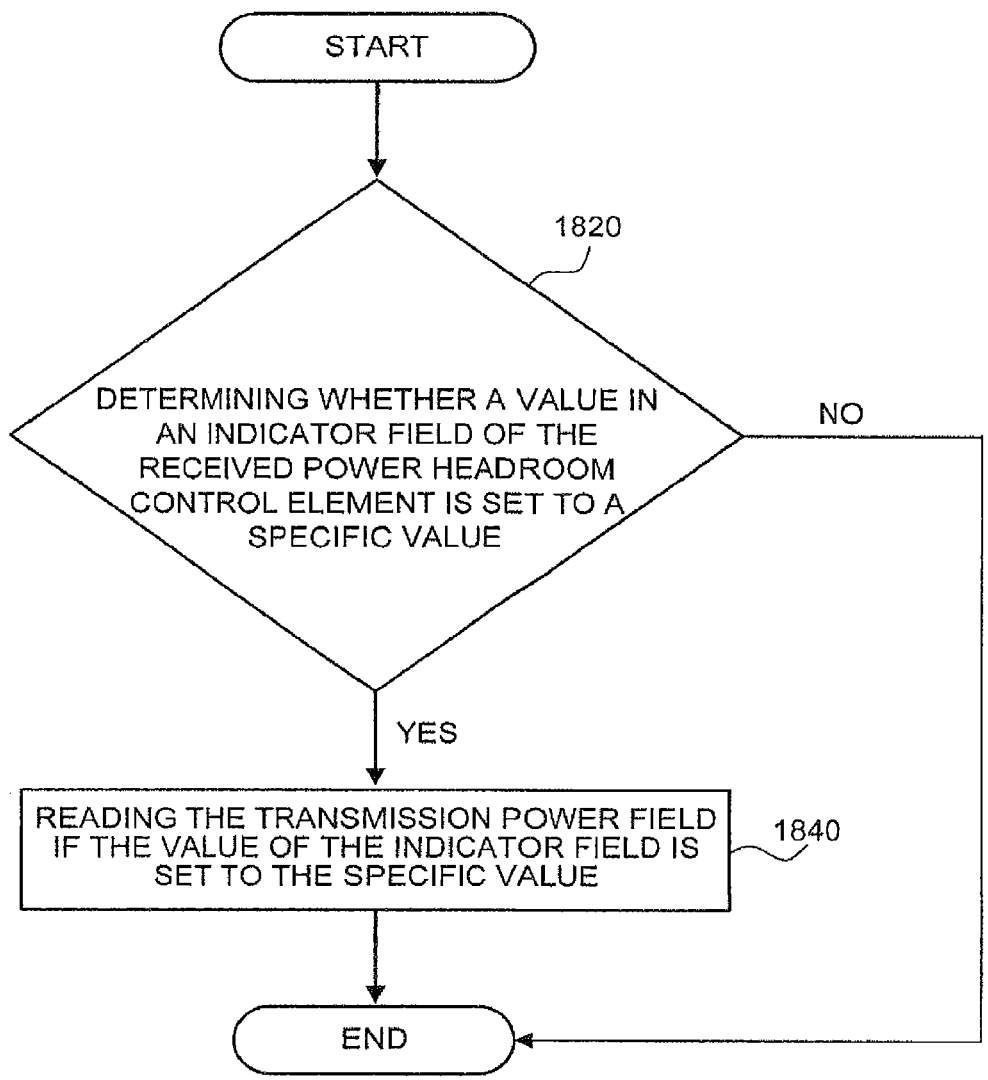
FIG. 18 illustrates a flow diagram of a method to be carried out by a base station for processing received power information according to an embodiment.

For example, the operations described with respect to FIGS. 16 and 17 may be carried out in a user terminal (UT), such as a user equipment (UE), and specifically by means specifically adapted or configured to carry out these steps, such as a processor which will be described in more detail with respect to FIG. 19. After the UE forwards the power information including one or more PHs and one or more transmission power reports associated with the PHs, the power headroom control element carrying the power information is received at a base station. The base station receives the power information and processes the power information as described in more detail with respect to FIG. 18.

Once the BS receives a PH control element from the UE including power information, the BS determines in step 1820 whether a value in an indicator field of the received PH control element is set to a specific value which indicates that a transmission power field associated with a PH field is included in the PH control element. For example, if the specific value is "1" as discussed with respect to FIG. 17, this indicates that the transmission power field and thus transmission power information, such as a Pcmax,c report, is included in the power headroom control element.

Then, the BS reads out the transmission power field in step 1840, if the value of the indicator field is set to the specific value "1" and so the BS obtains transmission power information.

If it is determined that the value of the indicator field is set to another specific value, such as "0", the BS understands that the specific PH was prepared based on a virtual transmission and that an associated transmission power field is not included. Accordingly, a following octet in the power headroom control element will not be interpreted as a transmission power field. Therefore, it is possible to provide a BS with clear instructions how to interpret the information sent in a power headroom control element. As a result, it is possible to report and handle transmission power information, such as Pcmax,c, efficiently.

In the above described embodiments, a power headroom control element is communicated, i.e. sent, from a UE to a BS in a RAN, wherein this power headroom control element includes one or more PH fields and zero or more Pcmax,c fields, and is structured as described above.

In the above described examples and embodiments it has been shown that it is possible to reuse the association between a PH value and a CC to associate the Pcmax,c with a PH instead of using an extra identifier to associate it with a CC.

This is achieved, for example, by using one of the R-bits in the octet including the PH of the power headroom control element to indicate if this PH, and thus also the CC associated with this PH, has an associated Pcmax,c report.

As the primary cell may have one or two PHs reported, as shown in FIGS. 6 to 14, which could potentially be based on different Pcmax,c values, the presence of one or two Pcmax,c reports could be decided based on a combination of the R-bits used for indication.

Further, it has been shown that an existing indicator may be used, for example one indicating that a so-called virtual or reference format PH is sent, to know whether a Pcmax,c report is transmitted or not. In this example, if a virtual/reference format PH is indicated, there will be no Pcmax,c report for this CC reported in this TTI. Further, one of the R-bits of the MAC subheader may be used to indicate that all PHRs reported in the specific TTI are associated with the same Pcmax,c report, at least for Type 1 reports, for example.

As a result, using the above described indicator, it is possible to find out that a PH is calculated using a virtual format and that a Pcmax,c is not sent, which can easily be indicated using one specific bit position telling whether Pcmax,c is there or not there in the power headroom control element.

Figure 20:
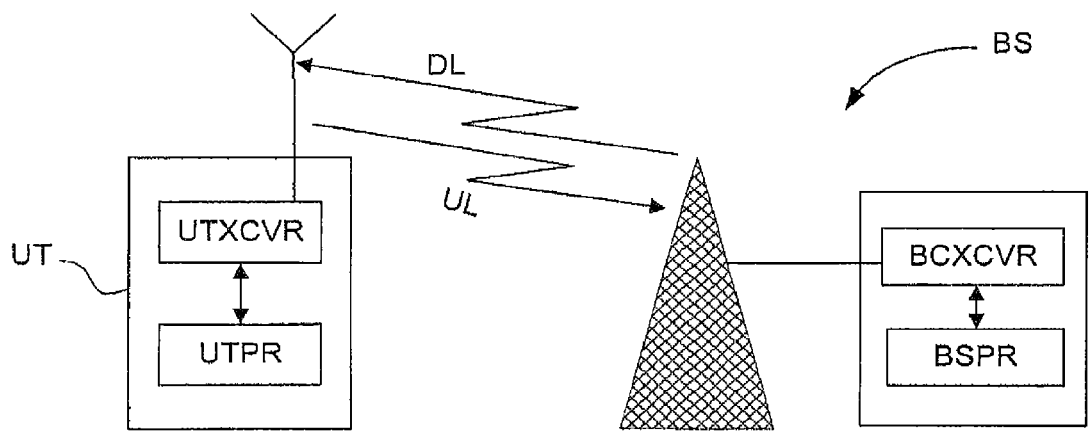
FIG. 20 illustrates a system comprising a user terminal and a base station according to an embodiment.

As discussed above, a user terminal (UT), referred to by way of example as user equipment or UE above, may communicate with a BS, referred to by way of example as an eNodeB above, using an Uplink (UL) for wireless radio transmissions from the UT to BS and using a Downlink (DL) for wireless radio transmissions from BS to UT as shown in FIG. 20 below.

Figure 19:
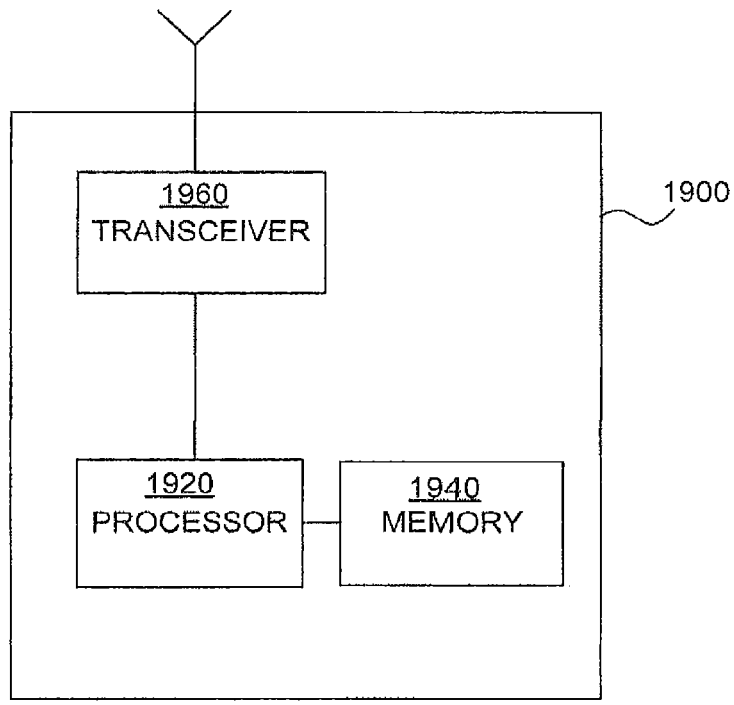
FIG. 19 illustrates a user equipment for communicating power information according to an embodiment.

As shown in FIG. 19 and FIG. 20, the user terminal UT, e.g. user equipment 1900, may include a processor 1920 in FIG. 19 or processor UTPR in FIG. 20. The processor may be coupled to a transceiver 1960 in FIG. 19 or transceiver UTXCVR in FIG. 20. Further, the processor is also connected preferably to a memory 1940.

The processor 1920 of the user equipment 1900 is, for example, configured to determine whether a transmission power field containing information about the transmission power of an uplink serving cell, e.g. Pcmax,c, associated with a power headroom is to be reported together with the power headroom. The processor is, for example, further configured to control adding the power headroom field and the transmission power field for transmission to a power headroom control element and setting an indicator to a specific value to indicate that the transmission power field is included, if it is determined that the transmission power field is to be sent. The details regarding the PH field(s) of the PHR, transmission power field(s) including transmission power information and the indicator field(s) have been described above and are also applicable here.

The memory 1940, may be a memory storing one of the above described power headroom control elements.

The transceiver 1960 or similarly the transceiver UTXCVR of FIG. 20 is adapted to transmit and receive communications, e.g. including the above described control elements.

In the following, the system shown in FIG. 20 is described in more detail. The system of FIG. 20 comprises a user terminal (UT) and a base station (BS). The processor UTPR of the UT may be configured to prepare power headroom report and/or Pcmax,c report communications for transmission as discussed above. Similarly, the BS may include a processor BSPR coupled to the transceiver BSTXCVR, and the processor BSPR may be configured to process received power headroom report and/or Pcmax,c report communications as discussed above.

In more detail, the BS may be configured to process received power information including a power headroom report of a received power headroom control element. The base station processor may be configured to determine whether a value in an indicator field of the received power headroom control element is set to a specific value which indicates that a transmission power field associated with a specific power headroom is included in the power headroom control element, and to read the transmission power field if the value is set to the specific value. Details of this operation have been described above.

In summary, according to the above, it possible to not report transmission power, e.g. Pcmax,c, for all CCs for which PH is reported for. This may be useful in the case when virtual format PH is reported and the BS, e.g. eNodeB, already has knowledge of the information contained in the associated Pcmax,c report and will thus not need to receive it.

Further, according to embodiments of the invention, it is not required to transmit any additional octets for identifying the Pcmax,c reports but existing reserved bits can be used. Even if a PH MAC CE solution which is not byte aligned is applied, only one extra bit per PH is required.

Furthermore, if Pcmax,c is to be reported except for CCs reporting PH using the virtual/reference PUSCH and/or PUCCH format, the information provided to the eNodeB via this R-bit regarding whether a Pcmax,c report is provided can also be used by the eNodeB to know if the specific PH is based on a virtual/reference format transmission or an actual transmission. Since embodiments of the invention would work the other way around too (if the presence of a Pcmax,c report is indicated according to one of the embodiments and its presence is dependent on a non-virtual/non-reference format PH) there are gains from getting two types of information from the same indicator bit.

While communications according to the LTE standard are mostly discussed by way of example, communications may be provided according to other wireless communications standards such as Advanced Mobile Phone Service (AMPS), ANSI-136, Global Standard for Mobile (GSM) communication, General Packet Radio Service (GPRS), enhanced data rates for GSM evolution (EDGE), DCS, PDC, PCS, code division multiple access (CDMA), wideband-CDMA, CDMA2000, and/or Universal Mobile Telecommunications System (UMTS) frequency bands. Moreover, user terminals/equipment according to embodiments of the present invention may, for example, be any wireless ("mobile") communication terminals ("wireless terminals" or "terminals") that are configured to carry out cellular communications (e.g., cellular voice and/or data communications) using multiple component carriers.

Various embodiments have been described fully herein with reference to the accompanying figures, in which various embodiments are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and were described in detail herein. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting the invention. As used herein, the singular forms 'a', "an" and "the" are intended to include the plural forms as well, unless the context clearly indicates otherwise. It will be further understood that the terms "comprises," "comprising," "includes," including," "have," "having" or variants thereof when used herein, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element or variants thereof, it can be directly responsive or connected to the other element, or intervening elements may be present. In contrast, when an element is referred to as being "directly responsive" or "directly connected" to another element or variants thereof, there are no intervening elements present, As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Moreover, although some of the diagrams include arrows on communication paths to show a primary direction of communication, it is to be understood that communication may occur in the opposite direction to the depicted arrows.

Entities according to different embodiments of the invention, including equipments and stations as well as devices, apparatuses and systems including processors and/or memories may comprise or store computer programs including instructions such that, when the computer programs are executed steps and operations according to embodiments of the invention are carried out, i.e. cause data processing means to carry out the operations. In particular, embodiments of the invention also relate to computer programs for carrying out the operations according to the embodiments of the invention, and to any computer-readable medium storing the computer programs for carrying out the above mentioned methods.

Similarly to specifically configured processors, different specific units may be used to carry out the functions of the above described equipments and stations or systems. Further, the functions may be distributed in different software or hardware components or devices for bringing about the intended function. A plurality of distinct units may also be gathered for providing the intended functionalities. The functions may also be implemented in hardware, software, field-programmable gate array (FPGA), application specific integrated circuit (ASIC), firmware or the like.

Exemplary embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit or a general purpose computer circuit, special purpose computer circuit, and/or other programmable data processing circuit to produce a machine, such that the instructions, which are executed via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CDROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.) that runs on a processor such as a digital signal processor, which may collectively be referred to as "circuitry", a "module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the specification, there have been disclosed embodiments of the invention and, although specific terms are employed, they are used in a generic and descriptive sense only and not for purposes of limitation.

Other implementations of the invention will be apparent to those skilled in the art from consideration of the specification and practise of the invention disclosed herein. It is intended that the specification and the examples be considered as exemplary only. To this end, it is to be understood that inventive aspects lie in less than all features of a single foregoing disclosed implementation or configuration. Thus, the true scope and spirit of the invention is indicated by the following claims.

The invention claimed is:

1. A power headroom control element for communicating power information from a UE, user equipment, to a base station in a RAN, Radio Access Network, the power headroom control element comprising:
    a power headroom field containing power headroom information and having a predetermined number of bits in the power headroom control element; and
    an indicator field associated with the power headroom field;

wherein the indicator field indicates whether a transmission power field with a predetermined number of bits is present in the power headroom control element, wherein the power headroom field containing the power headroom information is separate from the transmission power field.

2. The power headroom control element of claim 1, wherein the power headroom field containing the power headroom information is associated with an uplink serving cell.

3. The power headroom control element of claim 1, wherein the power headroom field precedes the associated transmission power field in the power headroom control element.

4. The power headroom control element of claim 1, wherein the transmission power field contains information about the transmission power of an uplink serving cell which is associated with the power headroom information.

5. The power headroom control element of claim 1, wherein the bits of the power headroom field and the associated indicator field form part of an octet of the power headroom control element, and/or the bits of the transmission power field form part of an octet of the power headroom control element.

6. The power headroom control element of claim 1, wherein the power headroom control element comprises a bitmap to indicate which uplink serving cell reports power headroom information as part of this power headroom control element.

7. The power headroom control element of claim 1, wherein the RAN is an LTE RAN, Long Term Evolution Radio Access Network.

8. A method of communicating power information including a power headroom from a UE, user equipment, to a base station in a RAN, Radio Access Network, the method comprising:
    determining whether a transmission power field containing information about a transmission power of an uplink serving cell associated with a power headroom is to be sent together with the power headroom; and
    based on determining that the transmission power field is to be sent, adding a power headroom field with a power headroom value and the transmission power field for transmission to a power headroom control element and setting an indicator to a specific value to indicate that the transmission power field is included,
    wherein the power headroom field with the power headroom value is separate from the transmission power field.

9. The method of claim 8, wherein the determining step is carried out if it is determined that a power headroom was triggered.

10. The method of claim 8, wherein the determination whether a transmission power field is to be sent is based on whether the cell has an uplink transmission.

11. The method of claim 8, wherein based on determining that the transmission power field is not to be sent, the power headroom field is added to a power headroom control element and the indicator is set to another specific value to indicate that the transmission power field is not included.

12. The method of claim 8, wherein based on determining that the power headroom is to be prepared based on a virtual transmission, setting the indicator to another specific value to indicate that an associated transmission power field is not included in the power headroom control element.

13. The method of claim 8, wherein the power headroom is included in a power headroom control element.

14. A method carried out by a base station in a RAN, Radio Access Network, for processing received power information including a power headroom report of a received power headroom control element from a UE, user equipment, the method comprising:
    determining whether a value in an indicator field associated with a power headroom field of the received power headroom control element is set to a specific value which indicates that a transmission power field associated with the power headroom field is included in the power headroom control element; and
    reading the transmission power field based on determining the value of the indicator field is set to the specific value,
    wherein the power headroom field contains power headroom information and is separate from the transmission power field.

15. The method of claim 14, wherein based on determining that the value of the indicator field is set to another specific value, the power headroom report was prepared based on a virtual transmission and that an associated transmission power field is not included.

16. A user equipment for communicating power information including a power headroom to a base station in a RAN, Radio Access Network, comprising:
    a processor configured to,
    determine whether a transmission power field containing information about the transmission power of an uplink serving cell (Pcmax,c) associated with the power headroom is to be sent together with the power headroom, and
    control adding a power headroom field with a power headroom value and the transmission power field for transmission to a power headroom control element and setting an indicator to a specific value to indicate that the transmission power field is included, if it is determined that the transmission power field is to be sent,
    wherein the power headroom field with the power headroom value is separate from the transmission power field.

17. A base station in a RAN, Radio Access Network, configured to process received power information including a power headroom report of a received power headroom control element from a UE, user equipment, the base station comprising:
    a processor (BSPR) configured to,
    determine whether a value in an indicator field associated with a power headroom field of the received power headroom control element is set to a specific value which indicates that a transmission power field associated with the power headroom field is included in the power headroom control element, and
    read the transmission power field based on determining the value is set to the specific value,
    wherein the power headroom contains power headroom information and is separate from the transmission power field.

18. The power control element of claim 1, wherein the transmission power field is placed after the power headroom field in the power headroom control element.

19. The power control element of claim 1, wherein the indicator field and the power headroom field are included in a first octet of the power headroom control element; and
    wherein the transmission power field is included in a second octet of the power headroom control element.

20. The method of claim 8, wherein the power headroom field precedes the transmission power field in the power headroom control element.

\* \* \* \* \*